(12) United States Patent
Swank et al.

(10) Patent No.: US 11,255,392 B2
(45) Date of Patent: Feb. 22, 2022

(54) TORQUE BAR AND METHODS FOR MAKING

(71) Applicant: GOODRICH CORPORATION, Charlotte, NC (US)

(72) Inventors: John Swank, Troy, OH (US); Todd Rook, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 1133 days.

(21) Appl. No.: 15/816,049

(22) Filed: Nov. 17, 2017

(65) Prior Publication Data
US 2018/0080513 A1    Mar. 22, 2018

Related U.S. Application Data

(62) Division of application No. 14/264,380, filed on Apr. 29, 2014, now Pat. No. 9,850,968.

(51) Int. Cl.
| | |
|---|---|
| *B33Y 10/00* | (2015.01) |
| *B33Y 80/00* | (2015.01) |
| *F16D 65/02* | (2006.01) |
| *B22C 7/02* | (2006.01) |
| *F16D 65/00* | (2006.01) |
| *B22D 25/02* | (2006.01) |

(Continued)

(52) U.S. Cl.
CPC ............... *F16D 65/02* (2013.01); *B22C 7/02* (2013.01); *B22D 25/02* (2013.01); *B22F 10/20* (2021.01); *F16D 55/36* (2013.01); *F16D 65/0006* (2013.01); *B33Y 10/00* (2014.12); *B33Y 80/00* (2014.12); *F16D 2065/138* (2013.01); *F16D 2065/1368* (2013.01); *F16D 2065/1392* (2013.01)

(58) Field of Classification Search
CPC ...... F16D 65/02; F16D 55/36; F16D 65/0006; F16D 2065/1368; F16D 2065/138; F16D 2065/1392; F16D 69/00; F16D 13/60; B22F 10/20; B22C 7/02; B33Y 10/00; B33Y 80/00; Y02P 10/25; B22D 15/02
See application file for complete search history.

(56) References Cited

U.S. PATENT DOCUMENTS

| | | |
|---|---|---|
| 5,186,521 A | 2/1993 | Niespodziany et al. |
| 5,697,847 A | 12/1997 | Meyer |

(Continued)

FOREIGN PATENT DOCUMENTS

| | | |
|---|---|---|
| EP | 0067113 | 12/1982 |

OTHER PUBLICATIONS

European Patent Office, European Office Action dated Apr. 11, 2018 in Application No. 15 165 319.3-1012.

(Continued)

*Primary Examiner* — Lawrence Averick
(74) *Attorney, Agent, or Firm* — Snell & Wilmer L.L.P.

(57) ABSTRACT

A torque bar manufactured by an additive manufacturing process is provided. The torque bar may include a torque bar body made of more than one metallic material. The torque bar may also include a geometry that comprises one or more voids and one or more webs, as well as a varied geometry in the direction of a longitudinal axis. The torque bars can exhibit characteristics, such as vibration damping, tuned stiffness, and tuned bending resistance in order to enhance dynamic stability.

4 Claims, 7 Drawing Sheets

(51) Int. Cl.
F16D 55/36 (2006.01)
B22F 10/20 (2021.01)

(56) References Cited

U.S. PATENT DOCUMENTS

| | | | |
|---|---|---|---|
| 5,851,056 | A | 12/1998 | Hyde |
| 5,915,503 | A * | 6/1999 | Enright .................... F16D 55/36 188/67 |
| 5,931,269 | A | 8/1999 | Detwiler et al. |
| 6,003,954 | A * | 12/1999 | Everhard ................ F16D 55/36 188/71.5 |
| 7,051,845 | B2 | 5/2006 | Thorp et al. |
| 7,198,236 | B2 | 4/2007 | Warner |
| 7,377,713 | B2 | 5/2008 | Schaap et al. |
| 7,390,067 | B2 | 6/2008 | Tong |
| 7,475,762 | B2 * | 1/2009 | Kaczynski ................. C23C 4/06 188/18 A |
| 8,087,177 | B2 | 1/2012 | Chisholm |
| 8,156,772 | B2 * | 4/2012 | Buhl ....................... E05B 71/00 70/49 |
| 8,157,062 | B2 * | 4/2012 | Enright .................... F16D 55/36 188/71.5 |
| 8,430,457 | B2 | 4/2013 | Baldassara |
| 8,870,889 | B2 | 10/2014 | Fray |
| 10,900,537 | B2 * | 1/2021 | Godfrey ................ F16F 9/3214 |
| 2005/0264090 | A1 * | 12/2005 | Kaczynski ............ C23C 28/027 301/6.1 |
| 2007/0023607 | A1 | 2/2007 | Franczyk |
| 2007/0236076 | A1 | 10/2007 | Tong et al. |
| 2008/0134619 | A1 | 6/2008 | Nichols |
| 2009/0277260 | A1 * | 11/2009 | Enright .................... F16D 65/78 73/115.07 |
| 2011/0154870 | A1 * | 6/2011 | Buhl ..................... E05B 67/003 70/233 |
| 2015/0047935 | A1 * | 2/2015 | Godfrey ................... F16F 9/19 188/298 |

OTHER PUBLICATIONS

Extended European Search Report dated Sep. 16, 2015 in European Application No. 15165319.3.
Advisory Action (PTOL-303) dated Aug. 31, 2017 in U.S. Appl. No. 14/264,380.
Advisory Action (PTOL-303) dated Oct. 6, 2016 in U.S. Appl. No. 14/264,380.
Final Rejection dated Jun. 20, 2017 in U.S. Appl. No. 14/264,380.
Final Rejection dated Jul. 29, 2016 in U.S. Appl. No. 14/264,380.
Non-Final Rejection dated Dec. 27, 2016 in U.S. Appl. No. 14/264,380.
Notice of Allowance and Fees Due (PTOL-85) in U.S. Appl. No. 14/264,380.

* cited by examiner

SECTION A-A

SECTION B-B

TORQUE BAR AND METHODS FOR MAKING

CROSS-REFERENCE TO RELATED APPLICATIONS

This application is a divisional of, claims priority to and the benefit of, U.S. Ser. No. 14/264,380 filed Apr. 29, 2014 and entitled "TORQUE BAR AND METHODS FOR MAKING," which is incorporated herein in its entirety for all purposes.

FIELD

The present disclosure relates to components of wheel and brake assemblies, and more specifically, to torque bars made using additive manufacturing.

BACKGROUND

Torque bars are typically used in aircraft wheel and brake assemblies to couple the wheels to the rotors of the brake assembly. Torque bars typically extend from an inner surface of the wheel in a direction parallel to the rotational axis of the wheel, and are subject to deflection and vibration.

The geometries of torque bars of the prior art are limited by conventional manufacturing techniques, such as subtractive manufacturing techniques. These geometric limitations can in turn limit the characteristics of the torque bars, such as, for example, their ability to resist deflection and dampen vibration. As such, the need exists for torque bars with improved geometries and configurations.

SUMMARY

An exemplary torque bar is manufactured using an additive manufacturing process. The torque bar may comprise a torque bar body having a mounting hole and a pin. In various embodiments, the torque bar body comprises a first perpendicular cross sectional profile and a second perpendicular cross sectional profile that are different from each other. The shape of the torque bar body can be configured to provide stiffness to the torque bar body. Further, the torque bar can comprise one or more voids.

A method for manufacturing a torque bar by an additive manufacturing process may comprise defining a torque bar design having a torque bar body, a mounting hole located in the torque bar body, and a coupling device, and manufacturing a torque bar based to be used in a subsequent casting process. In various embodiments, the step of defining a torque bar design comprises utilizing a two-dimensional modeling technique. The step of manufacturing the torque bar can further comprise the sub-steps of creating a prototype torque bar or prototype torque bar investment based on the torque bar design using an additive manufacturing process, and manufacturing a torque bar based on the prototype torque bar or prototype torque bar investment using a casting process.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
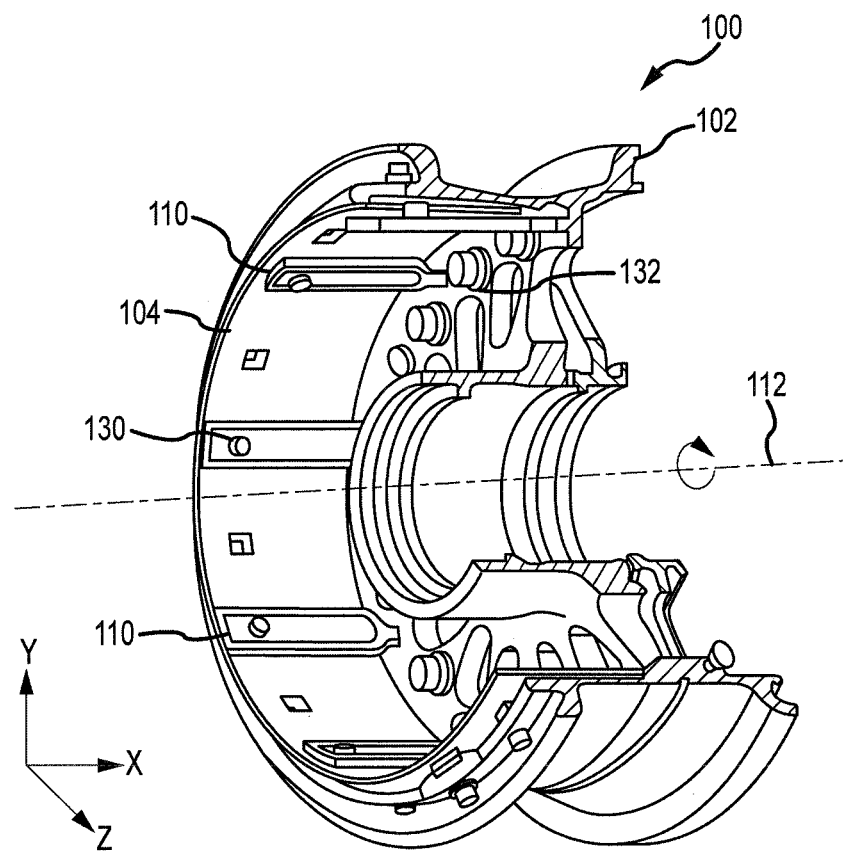
FIG. 1 illustrates a perspective view of a prior art wheel and brake housing.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Figure 2:
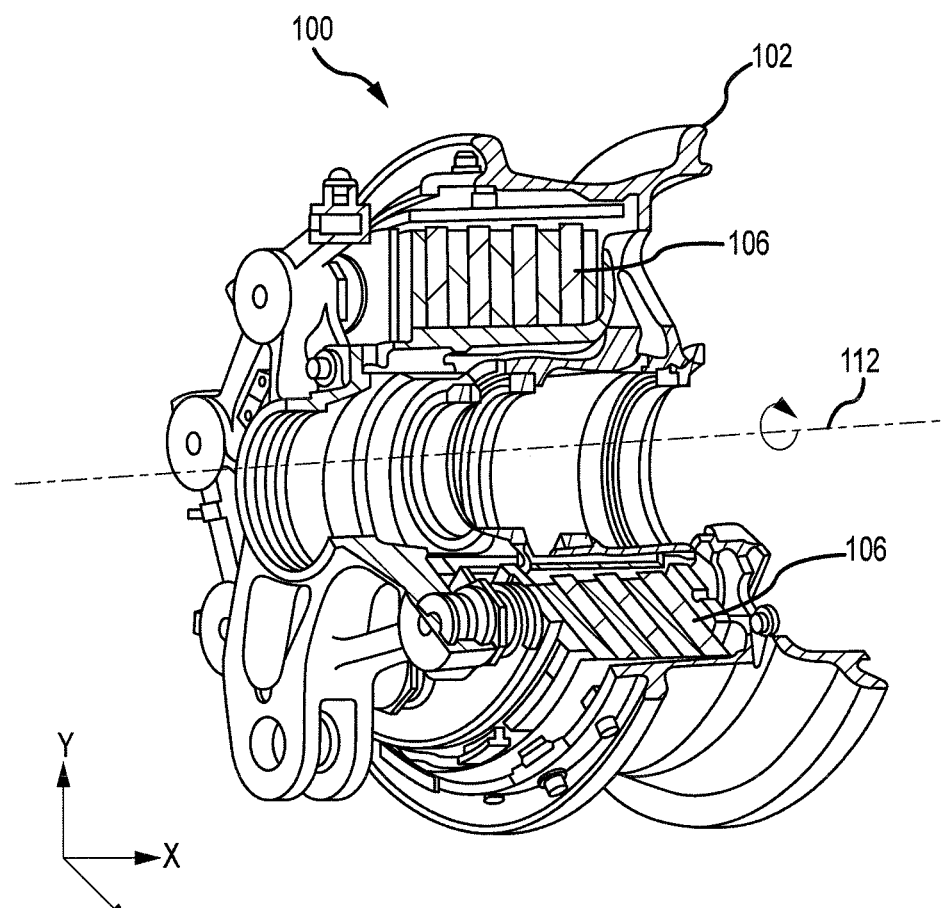
FIG. 2 illustrates a perspective view of a prior art wheel and brake housing.

In various embodiments and with reference to FIGS. 1 and 2, a wheel and brake assembly 100 can comprise a wheel 102 having a radially inner surface 104. A brake assembly 106 is disposed within wheel 102. In various embodiments, a plurality of torque bars 110 are oriented parallel to an axis of rotation 112 and coupled to wheel 102 and radially inner surface 104, and configured to engage with brake assembly 106.

Figure 3A:
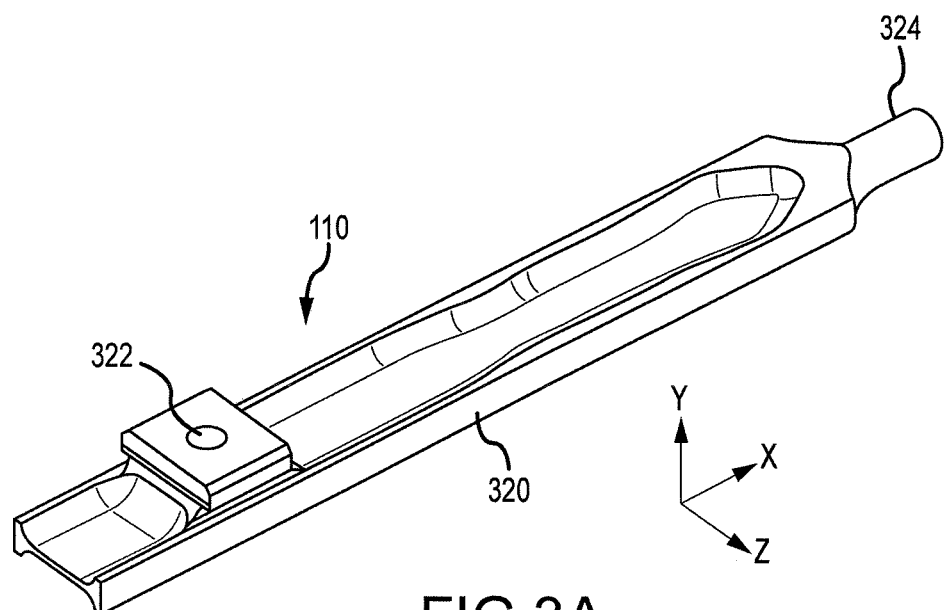
FIGS. 3A and 3B illustrate a perspective view and a top view, respectively, of a prior art torque bar.
Figure 3B:
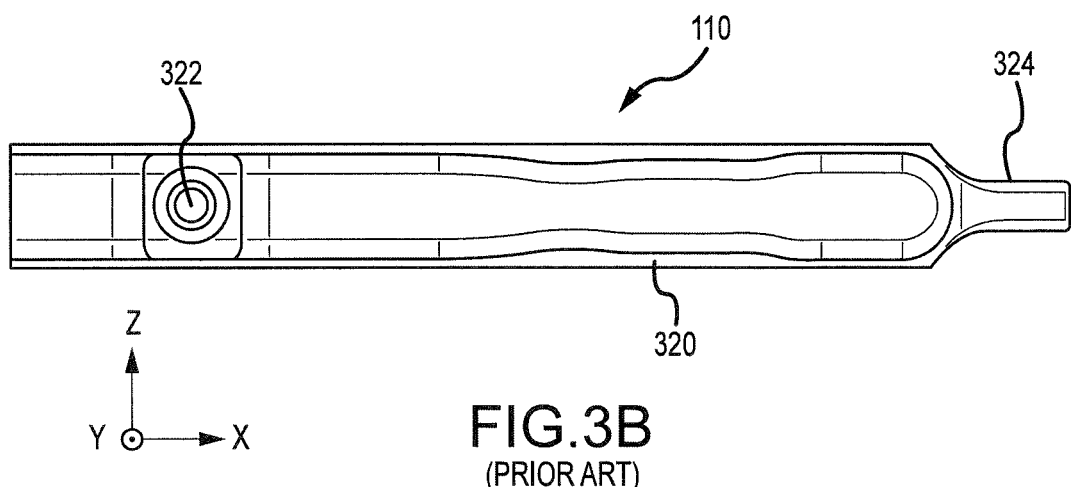

In various embodiments and with reference to FIGS. 3A and 3B, a torque bar 110 of the prior art is illustrated. Torque bar 110 comprises a torque bar body 320. Torque bar 110 further comprises a mounting hole 322. Mounting hole 322 can be configured to couple to radially inner surface 104. For example, as illustrated in FIG. 1, a bolt can be passed through a bolt hole 130 in radially inner surface 104 and into mounting hole 322.

Torque bar 110 can further comprise a pin 324. In various embodiments, pin 324 is configured to couple torque bar 110 to wheel 102. For example, as illustrated in FIG. 1, wheel 102 can comprise a pin receptacle 132 configured to receive pin 324. In various embodiments, pin receptacle 132 can comprise a pin or stud over which a hole in the end of pin 324 slides or engages. However, any manner of coupling torque bar 110 with wheel 102 is within the scope of the present disclosure.

Typically, torque bars of the prior art comprise a metal material, such as steel or nickel base superalloys, which is cast into the desired shape of the torque bar through traditional manufacturing methods, such as casting or subtractive manufacturing. Such techniques tend to limit the potential geometries and configurations of the resulting torque bars in that torque bars produced in this manner are prone to vibration during braking.

Figure 4:
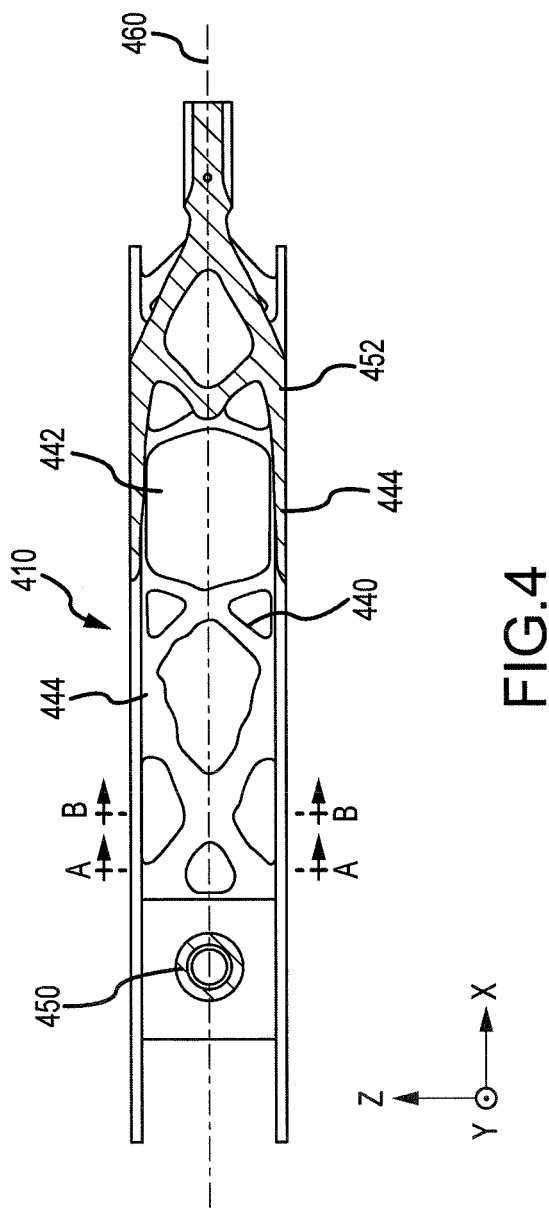
FIG. 4 illustrates a top view of a torque bar, in accordance with various embodiments.

In various embodiments and with reference to FIG. 4, improved torque bar 410 is made by additive manufacturing processes. Additive manufacturing techniques may allow the design of structures to be optimized for load, strength, tuned bending resistance, and improved vibration damping characteristics. In various embodiments, the geometry and configuration of torque bar 410 comprises a configuration that improves vibration performance (i.e., is resistant to vibration during braking), dynamic stability, among other benefits. Torque bar 410 can comprise structures optimized with geometric characteristics such as parallel rails 444, cross members 440 and voids 442, and/or the like to tune stiffness, reduce weight, tune bending resistance, and improve vibration characteristics.

For example, torque bar 410 can comprise two rails 444. In various embodiments, rails 444 are parallel to each other and longitudinally oriented, and are coupled to each other by one or more cross members 440.

Cross members 440 can, for example, connect one rail 444 with another longitudinally-oriented rail 444. In various embodiments, cross members 440 are integral to one or more rail 444. In that regard, the term "integral" in this context only may mean fabricated or manufactured as a single, continuous component. Cross members 440 can comprise a non-rectangular configuration such as, for example, a configuration having a round or oval shaped cross section. In various embodiments, cross members 440 comprise a web in which multiple cross members 440 are diagonally oriented with respect to rails 444 and intersect with each other between rails 444. In various embodiments, cross members 440 can comprise hollow structures. In other embodiments, cross members 440 can also comprise solid structures. In yet other embodiments, cross member 440 can comprise a structure having a honeycomb style cross section. Any structure of cross member 440 capable of coupling two longitudinally-oriented rails 444 is within the scope of the present disclosure.

Torque bar 410 can further comprise one or more voids 442 located between two parallel, longitudinally-oriented rails 444. For example, one or more voids 442 can be located between two cross members 440 that are diagonally oriented with respect to rails 444. One or more voids 442 can also be located between one rail 444 and one or more cross members 440. One or more voids 442 of different locations can be utilized in conjunction with one another.

Figure 5A:
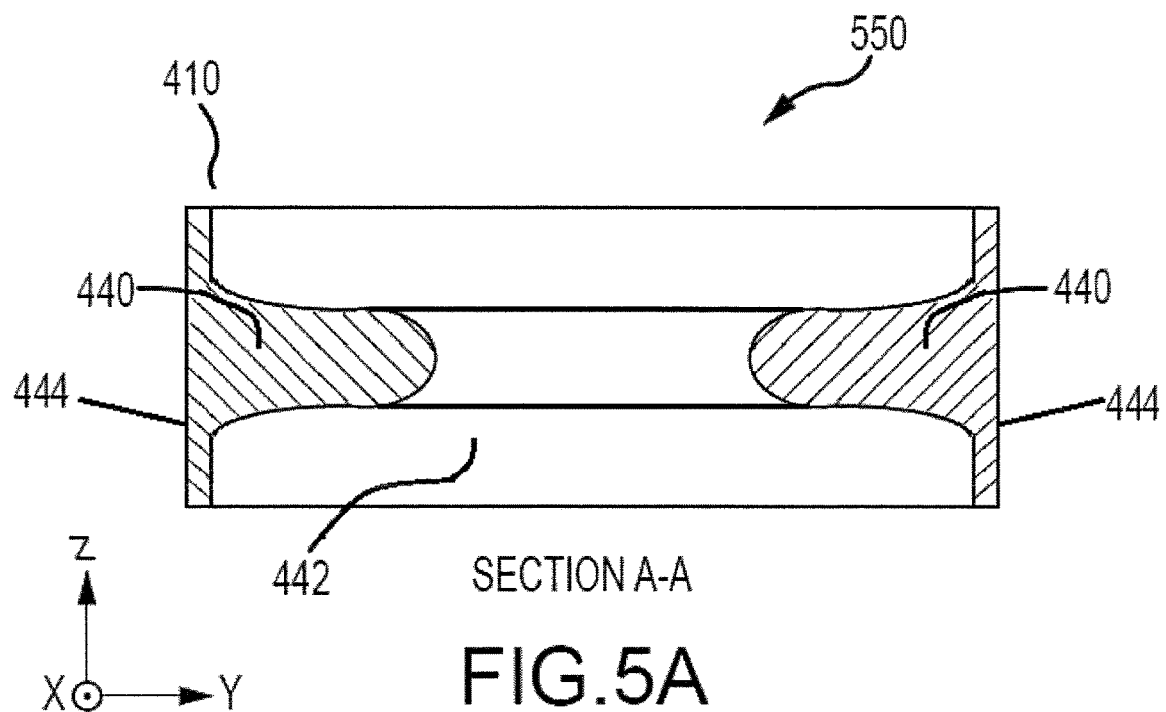
FIG. 5A illustrates a cross sectional view of the torque bar of FIG. 4 as viewed from the line A-A.
Figure 5B:
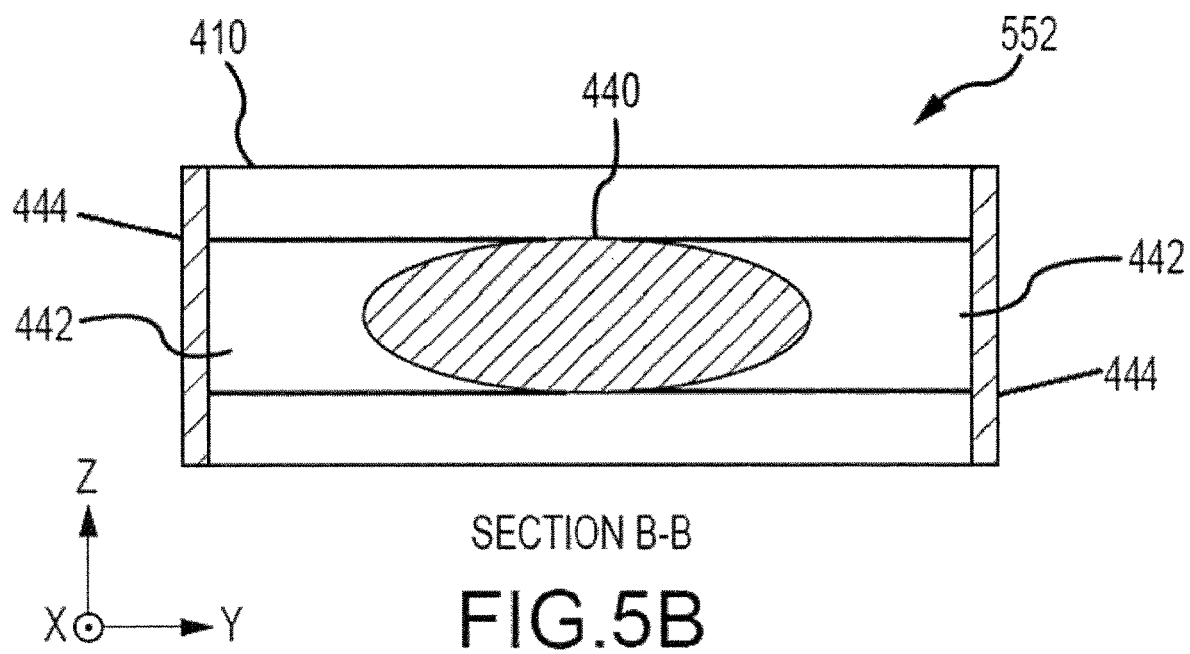
FIG. 5B illustrates a cross sectional views of the torque bar of FIG. 4 as viewed from the line B-B.

In various embodiments and with reference to FIGS. 5A and 5B, torque bar 410 can comprise a first cross sectional profile 550 perpendicular to a longitudinal axis 460 and a second cross sectional profile 552 perpendicular to longitudinal axis 460. In various embodiments, the geometry and configuration of torque bar 410 varies along longitudinal axis 460, such that first cross sectional profile 550 and second cross sectional profile 552 are different from each other. For example, first cross sectional profile 550 comprises one void 442 and two webs formed by cross members 440. Second cross sectional profile 552 is longitudinally displaced from first cross sectional profile 550 and comprises two voids 442 and one web formed by cross members 440. Although described with reference to specific configurations, first cross sectional profiles 550 and second cross sectional profiles 552 of any suitable geometry are within the scope of the present disclosure.

Torque bar 410 can comprise, for example, a first metal material 450 and a second metal material 452. In various embodiments, first metal material 450 can comprise a first steel or nickel base superalloy, and second metal material 452 can comprise a second steel or nickel base superalloy. Torque bar 410 can comprise a configuration in which first metal material 450 and second metal material 452 are combined as two distinct materials. In other embodiments, first metal material 450 and second metal material 452 are combined in a uniform manner. For example, first metal material 450 and second metal material 452 can form a gradient with respect to each other. However, any manner of combining any first metal material 450 and any second metal material 452 to form torque bar 410 is within the scope of the present disclosure. Further, torque bar 410 can comprise additional metal materials, such as a third metal material. The formation of a torque bar using any number of metal materials is within the scope of the present disclosure.

Figure 6:
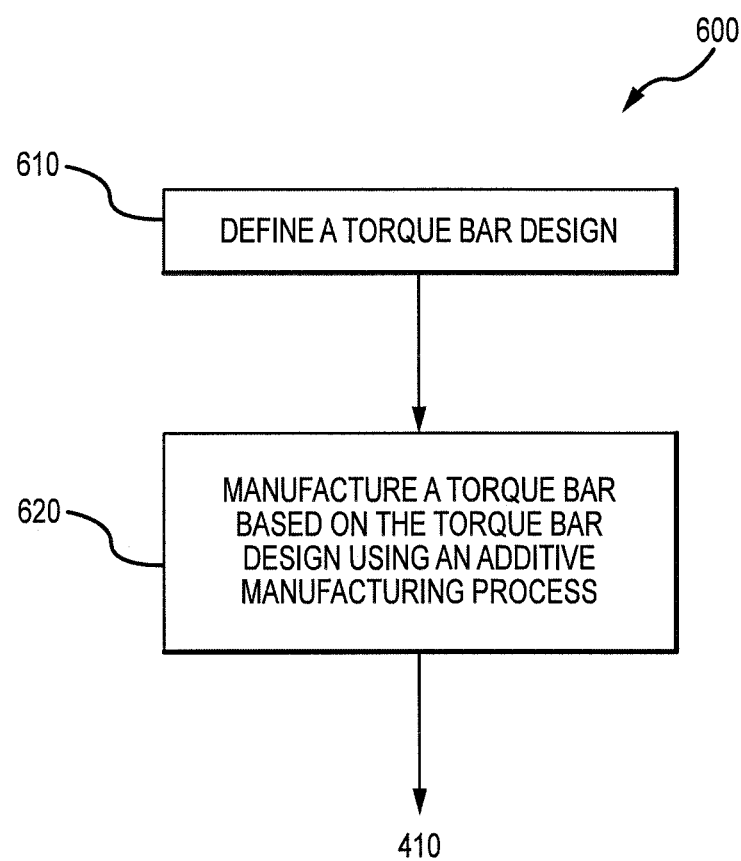
FIG. 6 is a process flow diagram for manufacturing a torque bar with additive manufacturing, in accordance with various embodiments.

In various embodiments and with reference to FIG. 6, a method for manufacturing a torque bar using additive manufacturing 600 can include defining a torque bar design (step 610). For example, step 610 can comprise utilizing two-dimensional modeling techniques to create a torque bar design having at least one of: improved dynamic stability, tuned stiffness, reduced weight, tuned bending resistance, and improved vibration damping. For example, the torque bar design of step 610 can include geometric attributes such as voids 442 and web formed by cross members 440, as well as asymmetric features to improve stability.

In various embodiments, the torque bar design of step 610 is then manufactured using an additive manufacturing technique (step 620). For example, step 620 can comprise using a technique such as direct laser sintering to manufacture a torque bar, such as torque bar 410, having the same geometry and configuration as the torque bar design of step 610.

Figure 7:
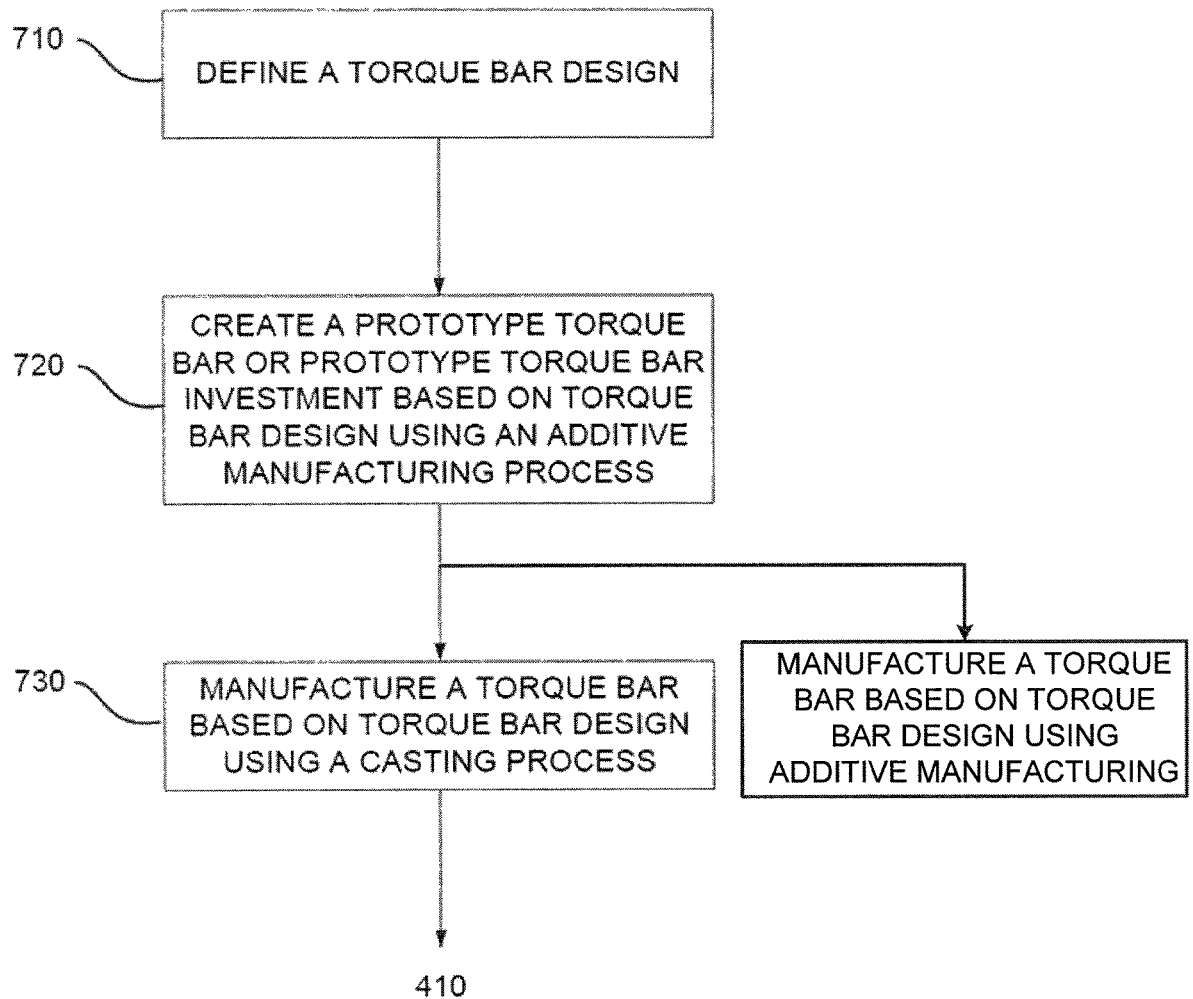
FIG. 7 is another process flow diagram for manufacturing a torque bar in accordance with various embodiments.

In various embodiments and with reference to FIG. 7, a method for manufacturing a torque bar using additive manufacturing 700 can include can include defining a torque bar design (step 710). Similarly to step 610 of method 600, step 710 can comprise utilizing two-dimensional modeling techniques to create a torque bar design having at least one of: improved dynamic stability, tuned stiffness, reduced weight, tuned bending resistance, and improved vibration damping. For example, the torque bar design of step 710 can include geometric attributes such as voids 442 and webs formed by cross members 440.

In various embodiments, a prototype torque bar or a prototype torque bar investment based on the torque bar design of step 710 is formed using an additive manufacturing process (step 720). For example, an additive manufacturing process can be used to form a polymeric or wax prototype torque bar based on the torque bar design of step 710. In other embodiments, an additive manufacturing process can be used to create a prototype torque bar investment based on the torque bar design of step 710. The prototype torque bar can be made from any material suitable for use in a manufacturing process to form a torque bar.

Process 700 can further comprise a step of manufacturing a torque bar based on the torque bar design of step 710 using a casting process (step 730). In various embodiments, step 730 comprises using the prototype torque bar created by an additive manufacturing process to form a mold or investment, which is then used in a casting process to manufacture a torque bar such as torque bar 410. In other embodiments, step 730 comprises using the prototype torque bar investment created by step 720 in a casting process to manufacture a torque bar such as torque bar 410. In yet other embodiments, step 730 comprises using the prototype torque bar to form a torque bar using an additive manufacturing process. However, any process in which the prototype torque bar or prototype torque bar investment created by an additive manufacturing process is used to manufacture a suitable torque bar is within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method, comprising:
defining a torque bar design comprising: a torque bar body having a first rail parallel to a second rail,
the first rail and the second rail joined by a first cross member and a second cross member,
wherein the first cross member and the second cross member form a web defining:
a first void bounded by the first cross member and the second cross member,
the first void extending completely through the torque bar body between the first rail and the second rail;
a second void bounded by the first rail,
the first cross member and the second cross member,
the second void extending completely through the torque bar body; and
a third void bounded by the second rail,
the first cross member and the second cross member,
the third void extending completely through the torque bar body;
a mounting hole located in the torque bar body; and
a pin extending longitudinally from the torque bar body wherein the torque bar body comprises a first perpendicular cross sectional profile that is different from a second perpendicular cross sectional profile, wherein the first perpendicular cross sectional profile includes the first void and the second perpendicular cross sectional profile includes the second void and the third void; and wherein the first cross member is diagonally oriented with respect to the first rail and the second rail, and wherein the second cross member is diagonally oriented with respect to the first rail and the second rail, and manufacturing a torque bar based on the torque bar design.

2. The method of claim 1, wherein the torque bar comprises a first metal material and a second metal material.

3. The method of claim 1, wherein manufacturing the torque bar comprises manufacturing the torque bar using an additive manufacturing process.

4. The method of claim 1,
wherein manufacturing the torque bar further comprises creating one of a prototype torque bar and a prototype torque bar investment based on the torque bar design using an additive manufacturing process; and using the prototype torque bar or the prototype torque bar investment created by the additive manufacturing process to manufacture the torque bar using a casting process.

* * * * *